Oct. 2, 1928.
G. M. KELLER
1,686,280
MIXER FOR MARGARINE AND THE LIKE
Filed May 25, 1927
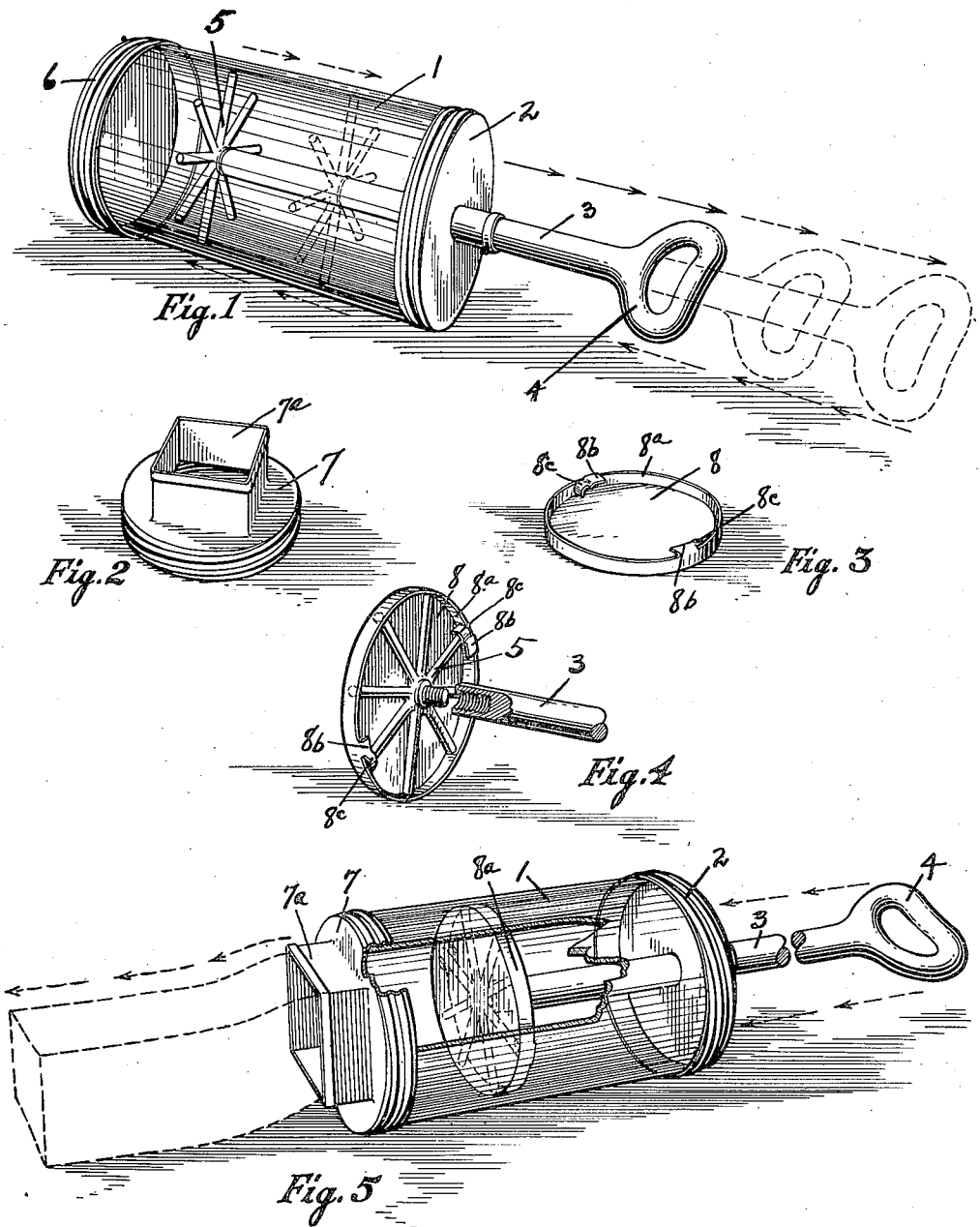
INVENTOR.
Graydon M. Keller
BY
ATTORNEY.

Patented Oct. 2, 1928.

1,686,280

UNITED STATES PATENT OFFICE.

GRAYDON M. KELLER, OF LOS ANGELES, CALIFORNIA, ASSIGNOR OF ONE-THIRD TO WILLIAM R. LITZENBERG, OF LOS ANGELES, CALIFORNIA.

MIXER FOR MARGARINE AND THE LIKE.

Application filed May 25, 1927. Serial No. 194,030.

My invention is particularly designed and worked out for mixing coloring matter with margarine, although it is evident that it can be used for mixing other materials together, and it has among its salient objects to provide a simple, practical and sanitary mixer for mixing coloring matter with margarine, or for mixing other materials together, without the necessity of using the hands in the materials to be mixed, and at the same time making the mixing operation visible so that one can tell when the operation is completed.

Another object of the invention is to provide a device from which the mixed product can be forced out of the container thereof by converting the mixing element into a plunger for this purpose and removing one end of the container and substituting therefor an end cap or cover with a forming opening therethrough, whereby the material as forced from said container is given a special form.

I accomplish this by providing a container open at both ends, preferably of glass and preferably of cylindrical form, with a removable cover at one end through which a mixing element works, and with a closure for the other end to be used during the mixing operation, and with a special closure to be interchanged therewith and having a discharge opening therethrough, whereby the mixed product can be forced out through said special closure by the mixing element after the latter has been converted into a plunger fitting within the body of the container.

In order to explain my invention, I have illustrated one practical embodiment thereof on the accompanying sheet of drawings, in which:

Figure 1 is a perspective view of my improved mixer as assembled for the mixing;

Figure 2 is a view of the interchangeable end cap for discharge of the product;

Figure 3 is a view of a cap or disk to be placed upon the mixer element to convert it into a piston-like plunger for forcing the product from the body of the device;

Figure 4 shows said cap or disk in place on the mixer element removed from the body or container; and Figure 5 shows the device as assembled for forcing the mixed product out in special form for use.

Referring now in detail to the drawings, I will describe the embodiment of the invention as here shown for illustrative purposes. The body or container 1, is preferably made of glass so as to make visible the mixing operation. It is provided with a closure member 2, through which operates a mixing element which includes a rod 3, with handle 4, and a mixer proper 5, operated as a plunger back and forth through said closure 2, within the body or container, as indicated in Fig. 1. Said mixer proper, 5, is shown as separate from the plunger rod 3, and adapted to be screwed thereto, as illustrated in Fig. 4, although it is evident that this could be otherwise attached to said rod. The opposite end of said body or container 1 is provided with an end cap or closure member 6, for use thereon during the mixing operation.

In Fig. 2 I have shown a discharge closure member 7, having a special discharge mouth $7^a$, whereby to give a special form to the product as it is forced from said container. This discharge closure member is interchangeable with the closure 6, as will be clear by a comparison of Figs. 1 and 5.

In order to convert the plunger mixer into a piston-like plunger for forcing the mixed product from the container, I have provided a cap or disk-like member 8, Figs. 3 and 4, adapted to be placed over the end of the mixer proper 5, and to this end said cap or disk is provided with a flange $8^a$, and at opposite sides said flange is provided with inturned portions $8^b$, with spring lips or extensions $8^c$, adapted to spring over the ends of two of the fingers of the mixer proper 5, as will be clear from Fig. 4, where said cap or disk is in place on the mixer proper. After the mixing operation, closure 2 is removed and the cap or disk 8 is placed over the fingers of the mixer proper 5, and it is again inserted into the container and the closure 2 turned back into place, whereupon as said plunger is pushed into the body or container, the content is forced out through the discharge closure 7, as in Fig. 5.

The use and operation of the invention may be briefly described as follows: With the parts assembled as in Fig. 1, closure 2 and the plunger mixer 3—5 is removed. The materials to be mixed, such as margarine and the coloring matter, usually in powdered form, are then placed in the body or container in soft condition. The closure 2 is replaced and as the device is held in one hand, the plunger mixer 3—5 is operated out and in repeatedly, at the same time turning the container in the hand and watching the mixing operation. The hands do not come into contact with the product at any time. When the mixing is completed, said closure 2 is again removed and the cap or disk 8 is placed upon the fingers of the mixer proper 5, as in Figs. 4 and 5. The parts are replaced, closure 6 is removed and discharge closure 7 placed upon the discharge end of the body 1, and then the piston-like plunger is forced inwardly to force the mixed product out through the discharge closure member 7, as illustrated in Fig. 5.

It will be evident that many changes in details of construction and arrangement can be made without departing from the spirit of the invention, and I do not, therefore, limit my invention to the embodiment thereof here shown for descriptive purposes, except as I may be limited by a broad construction of the hereto appended claims.

I claim:

1. A mixer of the character shown and described including in combination a transparent cylindrical body open at both ends, a closure for one end having a plunger rod opening therethrough, a plunger rod operable therethrough with a detachable mixer secured to its inner end, said mixer having radial fingers, a disc having an annular flange provided with attaching means adapted to be placed over the said fingers and to be attached to the ends of said fingers by means of said attaching means, whereby said disc covers said fingers, a removable closure member for the opposite end of said body, said closure member having a discharge mouth extension to give form to the material discharged therefrom.

2. In a mixer, a cylindrical body open at both ends, a closure member for one end with a plunger rod operable therethrough, a mixer on the inner end of said plunger rod, a disc having an annular flange around its edge and adapted to fit over said mixer within said cylindrical body, said annular flange being provided with attaching means to be detachably secured to said mixer, whereby to secure said disc with a turning movement to said mixer, and a closure for the other end of said body, said latter closure member having a mouth extension from the outer face of said closure member to give form to material discharged from said body, substantially as described.

Signed at Los Angeles, Los Angeles County, California, this 19th day of May, 1927.

GRAYDON M. KELLER.